Dec. 2, 1947.  E. WILDHABER  2,431,785
AXIALLY ENGAGING POSITIVE CLUTCH
Original Filed Oct. 17, 1942
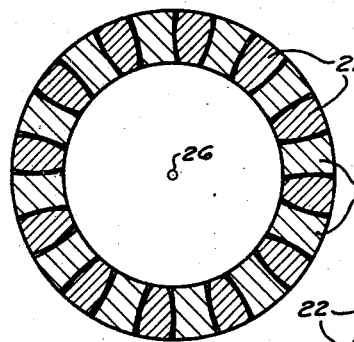
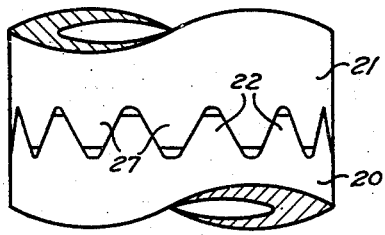
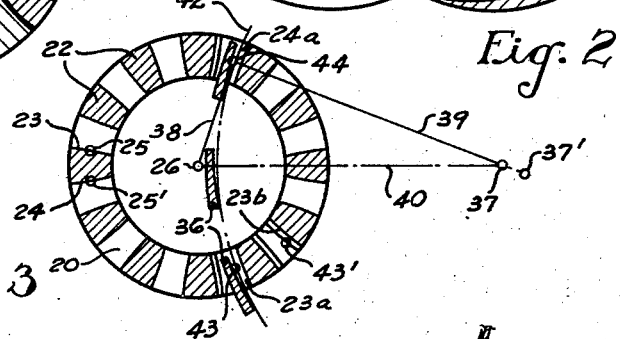
Inventor
ERNEST WILDHABER
By
Attorney Patented Dec. 2, 1947

2,431,785

UNITED STATES PATENT OFFICE 2,431,785

AXIALLY ENGAGING POSITIVE CLUTCH

Ernest Wildhaber, Brighton, N. Y., assignor to Gleason Works, Rochester, N. Y., a corporation of New York Original application October 17, 1942, Serial No. 462,389. Divided and this application March 12, 1945, Serial No. 582,348

10 Claims. (Cl. 192—67)

1

The present invention relates to toothed face clutches which have helical side tooth surfaces and to methods of producing such clutches. The present application is a division of my copending application Serial No. 462,389, filed October 17, 1942, now Patent Number 2,394,222, February 5, 1946, and is directed specifically to the novel clutch of this invention. Clutches with helical side tooth surfaces are used where it is desired that clutches disengage automatically under excessive loads, and in various other applications where it is desirable that the clutch members be capable of transmitting loads not only when fully engaged but also in positions of partial engagement.

One object of the invention is to provide a toothed face clutch of the character described in which the contacting tooth surfaces of the two clutch members will engage with less than full length tooth contact so that undue concentration of loads at the ends of the teeth may be avoided both when the clutch members are in engagement and when they are moving into or out of engagement.

A still further object of the invention is to provide a toothed face clutch member having helical tooth sides which will have proper engagement not only in full depth position but also in positions of partial engagement, such as a position of half depth.

Other objects of the invention will be apparent hereinafter from the specification and from the recital of the appended claims.

In the drawings:

Fig. 1 is a sectional view through a pair of engaged toothed face clutch members made according to one embodiment of this invention, the section being taken in a mean plane, hereinafter referred to as the pitch plane, which is perpendicular to the clutch axis;

Fig. 2 is a fragmentary elevational view of the engaging clutch members;

Fig. 3 is a diagrammatic view, showing one clutch member in section in the pitch plane, but illustrating, also, the relationship in the root plane between the cutter and the work during the cutting of this clutch member;

Fig. 4 is a part elevational, part sectional view taken at right angles to Fig. 3, and further illustrating diagrammatically the method of cutting this clutch member;

Figs. 5 and 6 are views, corresponding to Figs. 3 and 4, respectively, and illustrating diagrammatically one method of cutting the other clutch member; and

2

Fig. 7 is a diagrammatic view on an enlarged scale, further illustrating the method of cutting one of the clutch members according to this invention.

In the drawings, 20 and 21 (Fig. 2) denote, respectively, the two members of a clutch constructed according to one embodiment of this invention. The member 20 has teeth 22 whose opposite sides 23 and 24 are longitudinally convex, and which, at mean points, such as the points 25 and 25' along the length of the teeth, are truly radial of the clutch axis 26. The member 21 has teeth 27 whose opposite sides 28 and 29 are longitudinally concave and at mean points in the teeth length are also radial of the clutch axis. The terms "longitudinally concave" and "longitudinally convex" herein refer to the lengthwise curvature of the teeth from their outer to their inner ends, that is, in the direction radial of the clutch axis.

The sides of the teeth of both members are helical surfaces and can be considered as composed of helices concentric with the clutch axis 26. Two of the helices, which compose one side surface 23 of the clutch member 20, are indicated in dotted lines at 30 and 31, respectively, in Fig. 4. The helix 30 is at the inner end of the tooth side 23 and the helix 31 at the outer end thereof.

For cutting the side tooth surfaces of the clutch member 20, a face mill cutter 35 (Fig. 4) is employed that has a plurality of cutting blades 36 whose cutting portions project beyond one side face of the cutter in the general direction of the axis 37 of the cutter and are arranged circularly about said axis. The cutter is preferably positioned so that its axis 37 is parallel to the axis 26 of the clutch member. The cutter is also preferably so positioned that a tangent 38 (Fig. 3) to its periphery at mean point 44 of the clutch teeth will pass through the clutch axis 26. The axis 37 of the cutter intersects, therefore, a line 39 normal to the clutch radius 38.

Fig. 3 illustrates the limit case where the cutter axis 37 also lies in the plane 40 of symmetry containing the clutch axis 26. Circle 42 drawn about the cutter axis 37 through a mean point 44 in the root line of a side 24a of one tooth of the clutch member will then also pass through mean point 43 in the root line of the side 23a of a tooth of the clutch member which is spaced from the first named tooth.

The blades 36 of the cutter 35 have preferably straight sides 46 and 47 (Fig. 7) of positive pressure angle or inclination to the cutter axis 37 and rounded finish cutting edges 49 formed at the junctures of the inside edges 47 of the blades with the tip surfaces 48 of the blades. The rounded finish cutting edges 49 are preferably made circular arcuate in shape. Thus the center of the rounded portion 49 of the blade shown in Fig. 7 is at 50.

In cutting the clutch member 20, the cutter 35 is rotated on its axis 37 while a relative depthwise feed motion is effected between the cutter and work, preferably at a uniform rate, and preferably in the direction of the clutch axis 26. At the same time, the work 20 is rotated preferably at a uniform rate on its axis 26. At or near full-depth position, the feed motion is reversed while the rotary motion of the work continues in the same direction as during in-feed. During the out-feed motion a side of a tooth, spaced from the first tooth and opposite to the tooth side cut during in-feed, is finished. The out-feed is at the same rate as the in-feed and is also preferably uniform.

An initial position of the cutter at the beginning of the in-feed motion is shown in dotted lines at 35′ in Fig. 7. As the work is turned in the direction 56 and the relative in-feed progresses in, say, direction 55, the rounded portions 49 of the cutter blades generate the helical tooth side 23a. The side edges 46 and 47 serve simply to help remove stock but the finished shape of the side 23a is produced solely by the rounded edges 49 of the blades. The generation of the tooth side 23a is completed when the cutter has attained the full line position shown in Fig. 7. Thereafter reversal of the feed motion takes place. In the out-feed motion, the sides 46 of the cutter blades clear the final shape of the tooth surface 24 adjacent the tooth surface 23a which has been cut on the in-feed. During the out-feed, however, the finishing action has shifted and the rounded portions 49 of the cutter blades finish-cut in the other tooth zone in which the cutter operates, with the result that the tooth side 24a (Fig. 3) opposite to and spaced from the tooth side 23a is finished during the out-feed motion. 35″ (Fig. 7) denotes the position that the cutter reaches near the completion of the out-feed motion. When the cutter is clear of the blank, the blank is then indexed, and the cycle starts anew. It will thus be seen that opposite sides of two spaced teeth of the work, as, for instance, the sides 23a and 24a of the clutch are finished in a single cutting cycle, one side being finished during the in-feed, and the other side during the out-feed. If the blank is being cut from the solid, both tooth spaces are, of course, roughed out during the in-feed, but only side 23a is finished during the in-feed, the point-width of the cutter being slightly less than the finished width of the tooth space bottom. Only side 24a is finished on the out-feed because the blank rotates during the out-feed in the same direction as during the in-feed, and this rotation carries the toothside 23a away from the rounded portions 49 of the cutter blade and carries the toothside 24a into these rounded portions.

Where, as shown in Fig. 3, the axis 37 of the cutter lies in the plane of symmetry 40, a very fast reversal of the depthwise feed motion is required at the end of the in-feed. Practically no time can elapse between the end of the in-feed motion and the start of the out-feed motion. A slower, smoother operating reversal can be obtained by slightly decreasing the point width of the cutter and using a cutter of larger radius, centered further out on the line 39, as, for instance, at 37′. A circle centered at 37′ and containing the point 44 will then pass to the left of the point 43 with the result that more time may elapse between the generation of the opposite sides of the spaced teeth of the work, and therefore more time may be taken for reversal of the feed motion.

In cutting the tooth surfaces of the clutch member 21, which is to engage with the clutch member 20, a face mill cutter 60 (Fig. 6) is employed having cutting blades 61 arranged circularly about its axis. These blades 61 have rounded finish-cutting edges 62 formed at the junctures of their outside edges 63 and their tip edges 64. The rounded portion 62 of each blade is preferably a circular arc. The side edges 63 and 66 of the blades are preferably made straight.

In Fig. 5, the cutter 60 is shown in a limit position where its cutting circle 68 passes simultaneously through mean points 70 and 71 in the root lines of the helical tooth sides. The cutter center lies on a line 72 drawn at right angles to the clutch radius 73 and in the limit case the cutter axis also lies in the plane of symmetry 74 containing the clutch axis 26. As before, such a position requires quick reversal of the in-feed motion after one helical side tooth surface of the clutch member has been cut to full depth. By using a slightly smaller diameter than that shown, a longer time can be taken for reversal of the depth feed.

Except for the cutter and its radial setting, the process of generating the helical side tooth surfaces of the member 21 is the same as for generating the helical side tooth surfaces of the clutch member 20. The cutter is rotated in engagement with the work while a relative depthwise feed movement is effected between the cutter and the work preferably at a uniform rate and while simultaneously the work is rotated on its axis in time with the feed motion and preferably at a uniform rate. One helical side tooth surface of the work is generated during the in-feed and the opposite side of a spaced tooth of the work is generated during the out-feed.

The cutters employed for cutting the clutch members 20 and 21 may be provided with alternate blades having, respectively, opposite side rake to obtain keen inside and outside cutting edges, respectively. The cutters may also be provided with blades, each of which has both an outside and an inside cutting edge. In this case, keen cutting action may be obtained by sharpening each of the blades with a front hook so that its front face inclines rearwardly from its tip to its base.

As already pointed out, the finish-cutting of the helical side surfaces of the clutch member 20 is done wholly with rounded portions 49 at the insides of the blades of the cutter 35, while the finish-cutting of the helical side surfaces of the clutch member 21 is done wholly with rounded portions 62 at the outside of the blades of the cutter 60. The diameters of the two cutters 35 and 60 are different. The cutter 60 which finishes with the outside rounded portions of its blades being of the larger diameter. Because of this difference in the diameter of the two cutters, the lengthwise curvature of the contacting tooth surfaces of the two clutch members will differ. Hence, the contacting tooth surfaces of the two clutch members will engage with a localized tooth bearing which will extend for less than the full length of the teeth, easing off at the ends of the teeth. This condition is desirable as it prevents undue concentration of the tooth loads at the ends of the teeth. Additional easing off or mismatch can be obtained by using a cutter of smaller diameter to cut the clutch member 20, as, for instance, a cutter whose finishing circle would pass simultaneously through mean points 44 and 43' in the root lines of opposite sides 24a and 23b of spaced teeth of the work. The point 43' is a mean point in the root line of the tooth side 23b spaced one pitch closer to a tooth side 24a than the tooth side 23a. Additional mismatch can be obtained by cutting both members of the pair with cutters having inside finish cutting portions, that is, by cutting both members like the clutch member 20.

The root lines 80 and 81 of the teeth of clutch members cut in the manner described, that is, the tooth bottoms, lie in a plane perpendicular to the clutch axis 26. It is also preferred to have the top surfaces 82 and 83 of the clutch members lie in planes perpendicular to the clutch axis 26. Thus, the teeth of the clutch members may be of constant depth from end to end.

In general, it may be said that while the invention has been described in connection with a particular embodiment thereof, it will be understood that it is capable of still further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is

1. A toothed face clutch member having teeth whose sides are longitudinally curved helical surfaces, the centers of lengthwise curvature of opposite sides of a tooth lying at opposite sides of the tooth.

2. A toothed face clutch member having teeth whose sides are helical surfaces, opposite sides of each tooth being longitudinally convex.

3. A toothed face clutch member having teeth which are of constant height from end to end and whose side surfaces are longitudinally curved helical surfaces.

4. A toothed face clutch member having teeth which are of constant height from end to end whose side surfaces are longitudinally curved helical surfaces of constant lead.

5. A pair of toothed face clutch members, one of which has opposite side tooth surfaces which are longtudinally convex, and the other of which has opposite side tooth surfaces which are longitudinally concave, the opposite sides of the teeth of both members being helical surfaces.

6. A pair of toothed face clutch members, one of which has opposite side tooth surfaces which are longitudinally convex, and the other of which has opposite side tooth surfaces which are longitudinally concave, the opposite sides of the teeth of both members being helical surfaces of constant lead.

7. A pair of toothed face clutch members, one of which has opposite side tooth surfaces which are longitudinally convex and the other of which has opposite side tooth surfaces which are longitudinally concave, the opposite sides of the teeth of both members being helical surfaces, and the teeth of both members being of uniform height from end to end.

8. A pair of toothed face clutch members, one of which has opposite side tooth surfaces which are longitudinally convex, and the other of which has opposite side tooth surfaces which aren longitudinally concave, the opposite sides of the teeth of both members being helical surfaces, the contacting tooth surfaces of the two members having different lengthwise curvatures so that the contacting tooth surfaces have less than full length tooth engagement.

9. A toothed face clutch member having teeth whose side surfaces are longitudinally curved helical surfaces concentric with the axis of the clutch member.

10. A toothed face clutch member having teeth whose sides are helical surfaces, opposite sides of each tooth being longitudinally concave.

ERNEST WILDHABER.

REFERENCES CITED

The following references are of record in the file of this patent:

UNITED STATES PATENTS

| Number | Name | Date |
| --- | --- | --- |
| 344,611 | Applegate | June 29, 1886 |